United States Patent [19]

Saiga

[11] Patent Number: 5,163,542

[45] Date of Patent: Nov. 17, 1992

[54] CLUTCH ACTUATING HYDRAULIC CIRCUIT

[75] Inventor: Ryuichi Saiga, Komatsu, Japan

[73] Assignee: Kabushiki Kaisha Komatsu Seisakusho, Tokyo, Japan

[21] Appl. No.: 762,010

[22] PCT Filed: Feb. 28, 1990

[86] PCT No.: PCT/JP90/00262

§ 371 Date: Sep. 18, 1991

§ 102(e) Date: Sep. 18, 1991

[87] PCT Pub. No.: WO90/12217

PCT Pub. Date: Oct. 18, 1990

[30] Foreign Application Priority Data

Mar. 31, 1989 [JP] Japan .................. 1-82965

[51] Int. Cl.$^5$ .......... F16D 25/14; F16B 11/02
[52] U.S. Cl. .................. 192/85 R; 192/109 F; 91/6; 417/428
[58] Field of Search ........... 192/85 R, 109 F; 91/6, 91/28; 417/428

[56] References Cited

U.S. PATENT DOCUMENTS 3,809,201 5/1974 Miyanishi et al. ........... 192/109 F
3,985,063 10/1976 Lemon ........................ 192/109 F X

FOREIGN PATENT DOCUMENTS 1031648 6/1958 Fed. Rep. of Germany .
54-37061 11/1979 Japan .
55-115605 9/1980 Japan .
55-132402 9/1980 Japan .
57-154503 9/1982 Japan ..................... 91/6
58-29643 2/1983 Japan .
59-35771 8/1984 Japan .
60-101324 6/1985 Japan .
61-140621 6/1986 Japan .

OTHER PUBLICATIONS

Patent Abstracts of Japan, vol. 9, No. 249 (M-419) (1972), published Oct. 5, 1985.
Patent Abstracts of Japan, vol. 10, No. 336 (M-535) (2392), published Nov. 14, 1986.

Primary Examiner—Richard Lorence
Attorney, Agent, or Firm—Richards, Medlock & Andrews

[57] ABSTRACT

A switch-over valve 6 is provided in a pressure circuit 31 between a hydraulic pump 2a and a clutch 7, and a pressure limiting valve 5 is provided between a reflux circuit 9 for the valve 6 and the pressure circuit 31. The clutch actuating hydraulic circuit includes another hydraulic pump 2b, and a switch-over valve 8 for switching over a discharged fluid of the hydraulic pump 2b. A downstream side of the switch-over valve 8 is connected to the pressure circuit 31 and to the reflux circuit 9. Consequently, when the clutch is engaged or disengaged, the discharged fluid of the hydraulic pump 2b is combined with the discharged fluid of the hydraulic pump 2a so as to increase the flow rate to the clutch 7.

14 Claims, 2 Drawing Sheets

CLUTCH ACTUATING HYDRAULIC CIRCUIT

TECHNICAL FIELD

The present invention relates to a clutch actuating hydraulic circuit, and more particularly, to a clutch actuating hydraulic circuit suitable for reducing output loss in the clutch actuating hydraulic circuit.

BACKGROUND ART

Clutches fall into two types: one which is engaged when subjected to a pressure (and disengaged when no pressure is applied), and the other which is disengaged when subjected to a pressure (and engaged when no pressure acts thereon). The same clutch actuating hydraulic circuit can be used for actuating two types of such clutches by changing the reading of the operation of the hydraulic circuit. In the conventional clutch actuating hydraulic circuit shown in, for example, FIG. 4, if the clutch is of the former type, position 6A of a switch-over valve 6 indicates a clutch engaging position, while position 6B denotes a clutch disengaging position. Conversely, if the clutch is of the latter type, the position 6A indicates the clutch disengaging position, and the position 6B indicates the clutch engaging position. The clutch actuating hydraulic circuit, which will be described below, is one which employs the former type of clutch, unless otherwise indicated.

In FIG. 4, a hydraulic fluid sucked out of a reservoir 1 by a hydraulic pump 2 is applied to a switch-over valve 6 through a pressure circuit 31 as a discharged fluid of the hydraulic pump 2. When the switch-over valve 6 is at the position 6A, the discharged fluid is supplied to a clutch 7 to move a piston 71 and thereby allow a clutch disk and a clutch plate 72 to be pressed against each other, i.e., to engage the clutch 7. When the switch-over valve 6 is switched over to the position 6B, the hydraulic fluid in the pressure circuit 31 cannot advance beyond the position 6B of the switch-over value 6, and the pressure in the pressure circuit 31 thereby rises to the preset value of a pressure limiting valve 5 provided in the pressure circuit 31. Thereafter, the discharged fluid of the hydraulic pump 2 is returned from the pressure limiting valve 5 to the reservoir 1 through a reflux circuit 9. At the same time, the hydraulic fluid in the clutch 7 is also returned from the position 6B to the reservoir 1 through the reflux circuit 9.

However, the above-described conventional clutch actuating hydraulic circuit has the following disadvantages. Generally, discharge of a hydraulic pump required to actuate a hydraulic actuator is determined by a value obtained by multiplying a displacement of the hydraulic actuator by the operating time. Applying this formula to the clutch actuating hydraulic circuit, once the clutch 7 has been engaged, discharge of the hydraulic pump 2 is not required except to compensate for the leakage of the clutch actuating hydraulic circuit. However, in the conventional clutch actuating hydraulic circuit, after the clutch 7 has been engaged, the discharged fluid is pressurized to the preset value of the pressure limiting valve 5, and then returned to the reservoir 1. When the clutch 7 is not operated, i.e., when the hydraulic circuit is closed at the position 6B of the switch-over valve 6, pressure is generated in the clutch operating hydraulic circuit and increased to the preset value of the pressure limiting valve 5, despite the fact that there is no clutch 7 to be operated (discharge of the hydraulic pump 2 is not necessary). After the pressure in the hydraulic circuit has reached the preset value, all the discharged fluid of the hydraulic pump 2 is returned to the reservoir 1. In brief, the driving force for the hydraulic pump 2 to return the fluid to the reservoir is basically unnecessary (output loss).

In view of the aforementioned problems of the conventional technique, an object of the present invention is to provide a clutch actuating hydraulic circuit which is suitable for reduction of output loss.

SUMMARY OF INVENTION

The present invention provides a clutch 7 actuating hydraulic circuit in which a switch-over valve is provided in a pressure circuit between a hydraulic pump and a clutch and in which a pressure limiting valve is provided between a reflux circuit for the valve and the pressure circuit. The clutch actuating hydraulic circuit includes a second hydraulic pump, and a second switch-over valve for switching over a discharged fluid of the second hydraulic pump. A downstream side of the second switch-over valve is connected to the pressure circuit and to the reflux circuit.

In a first embodiment, a restrictor is provided in the pressure circuit. A downstream side of the restrictor is connected to the second switch-over valve for and switching over the discharged fluid of the second hydraulic pump through a pilot circuit. Alternatively, in a second embodiment a restrictor is provided on a downstream side of the pressure limiting valve. An upstream side of the restrictor is connected to the second switch-over valve through a pilot circuit.

In a third embodiment, the second switch-over valve for switching over the discharged fluid of the second hydraulic pump is an electromagnetic switch-over valve which is switched over using an electromagnet and a timer.

In the case of the former type of clutch as described in connection with the conventional technique, when the clutch is engaged (hereinafter this means "until engagement of the clutch is completed" unless otherwise defined), the discharged fluid of all the hydraulic pumps is combined with each other and then directed to the clutch. Therefore, the speed at which the clutch is engaged is increased. Once engagement of the clutch has been completed or when the clutch is disengaged, the other hydraulic pump serves as a small displacement hydraulic pump, and only an output for driving this small displacement hydraulic pump is provided. In other words, when the clutch is engaged, an output required to engage the clutch can be obtained. At the time other than the engagement of the clutch, an output required at that time can be generated. Consequently, an output loss can be reduced. In the case of the latter type of clutch, when the clutch is disengaged (hereinafter this means "until disengagement of the clutch is completed", unless otherwise defined), all the discharged fluid of the hydraulic pumps are combined with each other and are led to the clutch. Therefore, the speed at which the clutch is disengaged is increased. Once disengagement of the clutch is completed or when the clutch is engaged, the other hydraulic pump serves as a small displacement hydraulic pump, and only an output for driving this small displacement hydraulic pump is provided. In other words, when the clutch is disengaged, an output required to disengage the clutch can be obtained. At the time other than the disengagement of the clutch, an output required at that time can

BEST MODE FOR CARRYING OUT THE INVENTION

Figure 1:
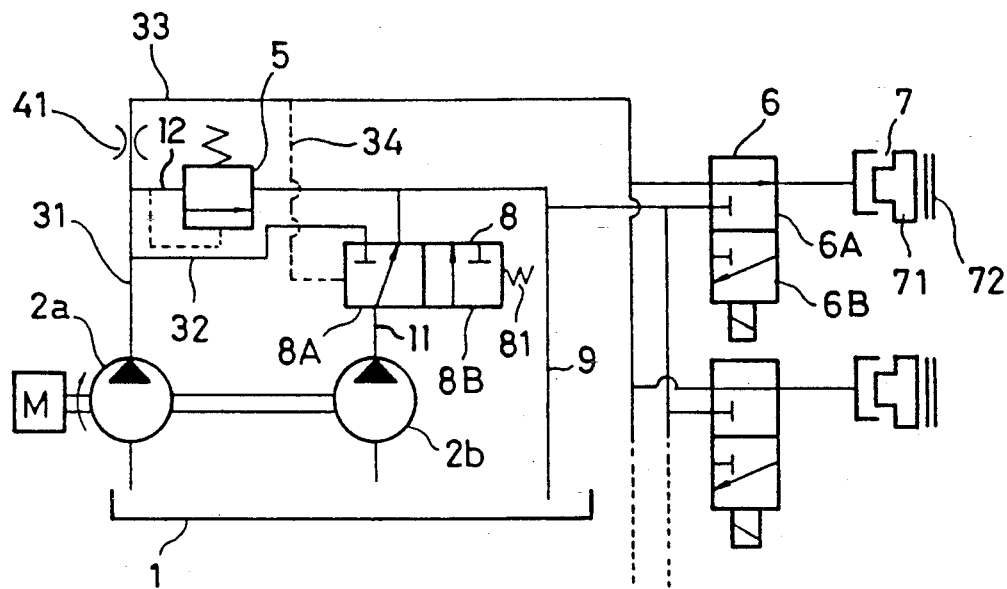
FIG. 1 shows a first embodiment of a clutch actuating hydraulic circuit according to the present invention.

Embodiments of a clutch actuating hydraulic circuit according to the present invention will be described with reference to FIGS. 1 to 3. These embodiments are constructed on the basis of the conventional hydraulic circuit (FIG. 4), description of the clutch operation being omitted. Also, these embodiments are of the type in which the clutch is engaged when subjected to the pressure. Each of the embodiments includes a single clutch and two hydraulic pumps 2a and 2b driven by the same power source. In the first embodiment, as shown in FIG. 1, the discharged fluid of the hydraulic pump 2a is applied to the switch-over value 6 through the pressure circuits 31 and 33. The pressure limiting valve 5 is positioned in circuit 12 with one end of circuit 12 being connected to pressure circuit 31 and the other end of circuit 12 being connected to reflux circuit 9. A combining circuit 32 is connected to the pressure circuit 31. In the pressure circuit 33, a pilot circuit 34 is provided to take out a pilot pressure. Between the pressure circuits 31 and 33, a restrictor 41 is mounted. Both the combining circuit 32 and the pilot circuit 34 are connected to the switch-over valve 8. The switch-over valve 8 is of the spring type and has three ports and two positions. The upstream side of the switch-over valve 8 is connected to the hydraulic pump 2b by circuit 11, and the downstream side of the switch-over valve 8 is connected to the combining circuit 32 and the reflux circuit 9. That is, the discharged fluid of the hydraulic pump 2b is supplied to the reflux circuit 9 when the switch-over valve 8 is switched over to a position 8A, and to the combining circuit 32 when the switch-over valve 8 is switched over to a position 8B. Which position the switch-over valve is switched over is determined by the relationship between the pilot pressure from the pilot circuit 34 and the bias of a spring 81 mounted on the switch-over valve 8. If the pilot pressure is higher than the bias of the spring 81, the switch-over valve 8 is switched over to the position 8A (as indicated in FIG. 1). Conversely, if the pilot pressure is lower than the bias of the spring 81, the valve 8 is switched over to the position 8B. The reflux circuit 9 is also connected to the position 6B. The operation of the thus-arranged hydraulic circuit will be described below. When the switch-over valve 6 is closed (switched over to the position 6B), the pressure of the discharge fluid from the hydraulic pump 2a is adjusted by the pressure limiting valve 5, and the fluid is returned to the reservoir 1. When the switch-over valve 6 is operated to open the path to the clutch 7 (as indicated in FIG. 1), the piston 71 is moved, and flow of the fluid toward the piston 71 is thereby generated. However, since the pressure circuit 31 is restricted by the restrictor 41, the pressure in the pressure circuit 33 decreases and the pilot pressure 34 of the switch-over valve 8 thereby becomes lower than the bias of the spring 81. Consequently, the switch-over valve 8 is switched over to the position 8B, and the discharged fluid of the hydraulic pump 2b is thereby combined to that of the hydraulic pump 2a through the combining circuit 32, thus increasing the moving speed of the piston 71. When the clutch 7 has become fully engaged, the movement of the piston 71 stops, and the pressure in the pressure circuit 33 thereby becomes close to the preset pressure of the pressure limiting valve 5. Consequently, the pilot pressure 34 of the switch-over valve 8 becomes higher than the bias of the spring 81, and the switch-over valve 8 is thereby switched over to the position 8A indicated in FIG. 1, returning the discharged fluid of the hydraulic pump 2b to the reservoir 1 in a non-loaded state. When the switched-over valve 6 is closed (switched-over to the position 6B), the same operation as that when the clutch 7 is engaged is conducted. That is, the discharged fluid of the hydraulic pump 2b is returned to the reservoir 1 in a non-loaded state. More specifically, in the present embodiment, since only a required discharge is provided when necessary, output loss can be reduced. In a case of a hydraulic circuit in which a plurality of clutches 7 are provided, the discharged fluids of the two hydraulic pumps 2a and 2b are combined with each other until engagement of one of the clutches is completed. At other times, the discharged fluid of the hydraulic pump 2b is returned to the reservoir 1 in a non-loaded state. If the returning fluid is returned through the lubricating system of the clutch, higher efficiency of the clutch actuating hydraulic circuit system may be obtained.

Figure 2:
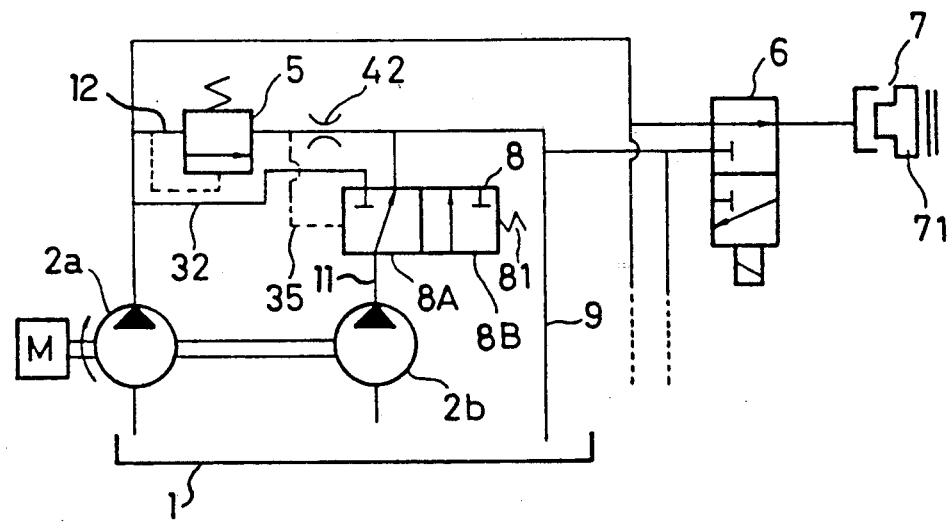
FIG. 2 shows a second embodiment of a clutch actuating hydraulic circuit according to the present invention.

FIG. 2 shows a second embodiment of the present invention. This embodiment differs from the first embodiment in that the restrictor 41 and the pilot circuit 34 are not provided, and in that a restrictor 42 is provided on the downstream side (in the reflux circuit 9) of the pressure limiting valve 5 while a pilot circuit 35 is provided on the upstream side of the restrictor 42 to take out a reflux pressure as a pilot pressure. In the thus-arranged structure, since the restrictor 42 is provided in the reflux circuit 9 of the pressure limiting valve 5, the returning fluid to the reservoir 1 is reduced due to the pressure limiting valve 5 during the movement of the piston 71 of the clutch 7. Consequently, the pressure in the pilot circuit 35 becomes lower than the bias of the spring 81, and the switch-over valve 8 is thereby switched over to the position 8B. As a result, the discharged fluid of the hydraulic pump 2b is combined with the discharged fluid of the hydraulic pump 2a through the combining circuit 32. When engagement of the clutch has been completed or when the clutch is disengaged, the returning fluid from the hydraulic pump 2a passes through the restrictor 42 of the reflux circuit 9, thus generating the pressure at the upstream side of the restrictor 42. Consequently, the pressure in the pilot circuit 35 becomes higher than the bias of the spring 81, and the switch-over valve 8 is thereby switched over to the position 8A. As a result, the discharged fluid of the hydraulic pump 2b is returned to the reservoir 1 in a non-loaded state.

Figure 3:
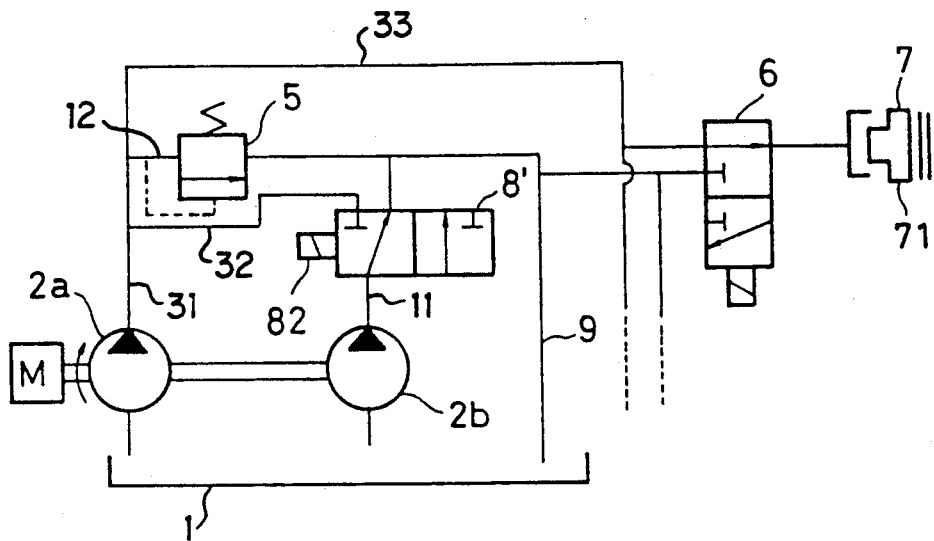
FIG. 3 shows a third embodiment of a clutch actuating hydraulic circuit according to the present invention.
Figure 4:
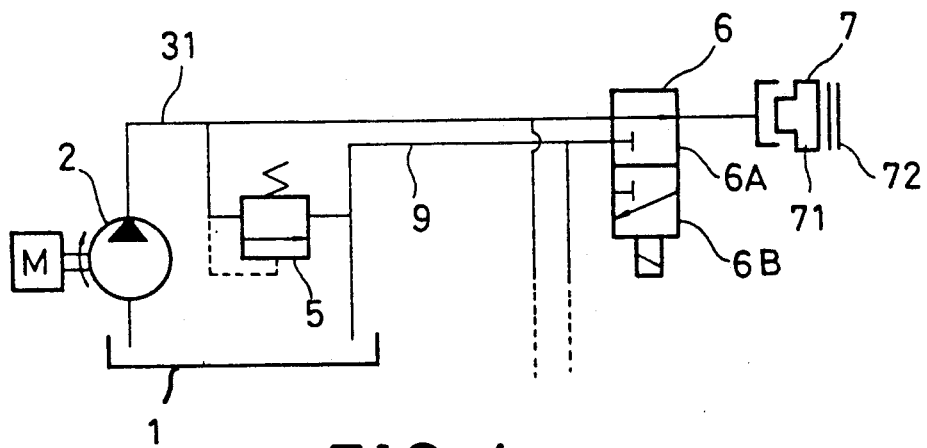
FIG. 4 shows a conventional clutch actuating hydraulic circuit.

A third embodiment shown in FIG. 3 differs from the first embodiment in that the restrictor 41 and the pilot circuit 34 provided in the first embodiment are eliminated, and in that the switch-over valve 8 is replaced by an electromagnetic switch-over valve. In this arrangement, the electromagnetic switch-over valve 8 is switched over concurrently with the switch-over of the switch-over valve 6 by an electromagnet 82 to make the outputs of the hydraulic pumps 2a and 2b combine with each other. After the engagement of the clutch has been completed, the electromagnetic switch-over valve 8 is reset using a timer. In the above-described embodiments, a hydraulic circuit in which the clutch is engaged when subjected to the pressure has been described. However, the present invention can also be applied to a hydraulic circuit in which the clutch is disengaged when subjected to the pressure.

INDUSTRIAL APPLICABILITY

The present invention is suitable for reduction of output loss of the clutch actuating hydraulic circuit. Since the discharged fluid of at least one of the hydraulic pumps is combined with the discharged fluid of another hydraulic pump when the clutch is engaged (or disengaged), the flow rate to the clutch is increased. Therefore, a clutch actuating hydraulic circuit capable of reducing output loss of the clutch actuating hydraulic circuit can be provided.

What is claimed is:

1. A clutch actuating hydraulic circuit comprising:
   a first hydraulic pump having a discharge outlet;
   a second hydraulic pump having a discharge outlet;
   a hydraulic clutch;
   a first switch-over valve having first and second positions;
   a second switch-over valve having first and second positions and an upstream side and a downstream side;
   a first hydraulic circuit connected to the discharge outlet of said first hydraulic pump;
   a second hydraulic circuit connected between said discharge outlet of said second hydraulic pump and said upstream side of said second switch-over valve;
   a third hydraulic circuit connected to the downstream side of said second switch-over valve;
   a fourth hydraulic circuit connected between said first switch-over valve and said first and third hydraulic circuits;
   a hydraulic reservoir;
   a fifth hydraulic circuit connected between said first switch-over valve and said hydraulic reservoir and between the downstream side of said second switch-over valve and said hydraulic reservoir, said fifth hydraulic circuit being a reflux circuit for return of hydraulic fluid to said reservoir;
   a sixth hydraulic circuit containing a pressure limiting valve, said sixth hydraulic circuit being connected between said fourth hydraulic circuit and said fifth hydraulic circuit, said pressure limiting valve providing for flow from said fourth hydraulic circuit to said fifth hydraulic circuit when the pressure in said sixth hydraulic circuit between said pressure limiting valve and said fourth hydraulic circuit exceeds a preset value;
   said first switch-over valve, in its first position, connecting said fourth hydraulic circuit to said clutch;
   said first switch-over valve, in its second position, connecting said clutch to said fifth hydraulic circuit;
   said second switch-over valve, in its first position, connecting said second hydraulic pressure circuit to said third hydraulic circuit; said second switch-over valve, in its second position, connecting said second hydraulic circuit to said fifth hydraulic circuit; and
   means for actuating said second switch-over valve to its first position when it is desired that hydraulic fluid be passed through said first switch-over valve, in its first position, to said clutch to effect a particular action of said clutch, and for actuating said second switch-over valve to its second position when said particular action is completed;
   whereby discharge fluid from said first and second hydraulic pumps are combined to provide the hydraulic fluid to said clutch to effect said particular action, thereby increasing the speed at which said clutch is operated for said particular action, and whereby discharge fluid from said second hydraulic pump is returned to the reservoir in a non-loaded state when said particular action is completed, thereby reducing the drive force for said first and second hydraulic pumps to return to the reservoir the hydraulic fluid discharged from said first and second hydraulic pumps.

2. A clutch actuating hydraulic circuit in accordance with claim 1, wherein said means for actuating said second switch-over valve comprises a restrictor positioned in said fourth hydraulic circuit between sixth hydraulic circuit and said first switch-over valve, and a pilot pressure line connected to one end of said second switch-over valve and to said fourth hydraulic circuit between said restrictor and said first switch-over valve, said second switch-over valve being biased to its first position other than when the pressure in said pilot pressure line is sufficient to overcome the bias on said second switch-over valve.

3. A clutch actuating hydraulic circuit in accordance with claim 2, wherein the bias for said second switch-over valve is provided by a spring.

4. A clutch actuating hydraulic circuit in accordance with claim 3, wherein said first and second hydraulic pumps are driven by the same power source.

5. A clutch actuating hydraulic circuit in accordance with claim 4 wherein engagement of the clutch is achieved by the application of hydraulic pressure to said clutch.

6. A clutch actuating hydraulic circuit in accordance with claim 1, wherein said means for actuating said second switch-over valve comprises a restrictor positioned in said sixth hydraulic circuit between said pressure limiting valve and said fifth hydraulic circuit, and a pilot pressure line connected to one end of said second switch-over valve and to said sixth hydraulic circuit between said restrictor and said pressure limiting valve, said second switch-over valve being biased to its first position other than when the pressure in said pilot pressure line is sufficient to overcome the bias on said second witch-over valve.

7. A clutch actuating hydraulic circuit in accordance with claim 6, wherein the bias for said second switch-over valve is provided by a spring.

8. A clutch actuating hydraulic circuit in accordance with claim 7 wherein said first and second hydraulic pumps are driven by the same power source.

9. A clutch actuating hydraulic circuit in accordance with claim 8 wherein engagement of the clutch is achieved by the application of hydraulic pressure to said clutch.

10. A clutch actuating hydraulic circuit in accordance with claim 1, wherein said means for actuating said second switch-over valve comprises an electromagnet and a timer.

11. A clutch actuating hydraulic circuit in accordance with claim 10 wherein said first and second hydraulic pumps are driven by the same power source.

12. A clutch actuating hydraulic circuit in accordance with claim 11 wherein engagement of the clutch is achieved by the application of hydraulic pressure to said clutch.

13. A clutch actuating hydraulic circuit in accordance with claim 1 wherein said first and second hydraulic pumps are driven by the same power source.

14. A clutch actuating hydraulic circuit in accordance with claim 1 wherein engagement of the clutch is achieved by the application of hydraulic pressure to said clutch.

* * * * *